(12) United States Patent
Nishiyama et al.

(10) Patent No.: US 7,652,407 B2
(45) Date of Patent: Jan. 26, 2010

(54) DRIVING DEVICE CAPABLE OF IMPROVING A SHOCK AND VIBRATION RESISTANCE THEREOF

(75) Inventors: Takahiko Nishiyama, Kanagawa (JP); Tsukasa Yamada, Kanagawa (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 0 days.

(21) Appl. No.: 12/082,947

(22) Filed: Apr. 15, 2008

(65) Prior Publication Data
US 2008/0297000 A1 Dec. 4, 2008

(30) Foreign Application Priority Data
Apr. 17, 2007 (JP) ............... 2007-107717

(51) Int. Cl.
*H01L 41/08* (2006.01)
(52) U.S. Cl. ................... 310/310; 310/323.02
(58) Field of Classification Search ............ 310/323.02, 310/328
See application file for complete search history.

(56) References Cited

U.S. PATENT DOCUMENTS

| | | | |
|---|---|---|---|
| 4,786,836 A | 11/1988 | Tokushima | |
| 4,830,500 A | 5/1989 | Kuroki et al. | |
| 5,225,941 A | 7/1993 | Saito et al. | |
| 5,442,166 A | 8/1995 | Hollmann | |
| 5,589,723 A | 12/1996 | Yoshida et al. | |
| 5,890,391 A | 4/1999 | Okada | |
| 6,084,363 A | 7/2000 | Mizumoto | |
| 6,111,336 A | 8/2000 | Yoshida et al. | |
| 6,114,799 A | 9/2000 | Yoshida et al. | |
| 6,140,750 A * | 10/2000 | Ueyama | 310/369 |
| 6,188,161 B1 | 2/2001 | Yoshida et al. | |
| 6,232,697 B1 * | 5/2001 | Mizumoto | 310/317 |
| 6,392,827 B1 * | 5/2002 | Ueyama et al. | 359/824 |
| 6,528,926 B2 * | 3/2003 | Okamoto et al. | 310/323.17 |
| 6,856,072 B2 | 2/2005 | Kosaka et al. | |
| 7,157,830 B2 | 1/2007 | Jansson et al. | |

(Continued)

FOREIGN PATENT DOCUMENTS

EP    1 605 290 A2    12/2005

(Continued)

OTHER PUBLICATIONS

U.S. Appl. No. 12/082,939, filed Apr. 15, 2008, Entitled "Driving Device Capable of Obtaining a Stable Frequency Characteristic" Inventor: Takahashi et al.

(Continued)

*Primary Examiner*—Mark Budd
(74) *Attorney, Agent, or Firm*—Frishauf, Holtz, Goodman & Chick, P.C.

(57) ABSTRACT

A driving device includes an electro-mechanical transducer having first and second end portions opposite to each other in an expansion/contraction direction, a static member coupled to the first end portion of the electro-mechanical transducer, a vibration friction portion coupled to the second end portion of the electro-mechanical transducer, and a rod-shaped moving portion frictionally coupled to the vibration friction portion, whereby moving the moving portion in the expansion/contraction direction of the electro-mechanical transducer. An outer sheath is for covering the driving device. An attitude retaining arrangement retains an attitude of the driving device with respect to the outer sheath.

4 Claims, 14 Drawing Sheets

U.S. PATENT DOCUMENTS

| | | | |
|---|---|---|---|
| 7,173,363 B2 | 2/2007 | Hendriks et al. | |
| 7,199,506 B2 * | 4/2007 | Sasaki et al. | 310/328 |
| 7,271,522 B2 * | 9/2007 | Yuasa et al. | 310/317 |
| 7,342,347 B2 | 3/2008 | Magnussen et al. | |
| 7,355,325 B2 | 4/2008 | Johansson et al. | |
| 7,355,802 B2 | 4/2008 | Homme | |
| 7,368,854 B2 * | 5/2008 | Manabe | 310/323.17 |
| 2002/0038988 A1 | 4/2002 | Matsuo et al. | |
| 2002/0109434 A1 | 8/2002 | Seki | |
| 2004/0000903 A1 | 1/2004 | Morimoto | |
| 2005/0127789 A1 | 6/2005 | Magnussen et al. | |
| 2005/0275315 A1 * | 12/2005 | Manabe et al. | 310/328 |
| 2006/0103266 A1 | 5/2006 | Okamoto | |
| 2007/0036533 A1 * | 2/2007 | Sasaki | 396/75 |
| 2007/0096601 A1 | 5/2007 | Sueyoshi et al. | |

FOREIGN PATENT DOCUMENTS

| | | |
|---|---|---|
| EP | 1 755 176 A2 | 2/2007 |
| EP | 1 845 607 A | 10/2007 |
| JP | 6-174999 A | 6/1994 |
| JP | 7-49442 A | 2/1995 |
| JP | 2633066 B2 | 4/1997 |
| JP | 9-191665 A | 7/1997 |
| JP | 10-337057 A | 12/1998 |
| JP | 3002890 B2 | 11/1999 |
| JP | 3141714 B2 | 12/2000 |
| JP | 3171000 B2 | 3/2001 |
| JP | 3180557 B2 | 4/2001 |
| JP | 3212225 B2 | 7/2001 |
| JP | 3218851 B2 | 8/2001 |
| JP | 2003-185406 A | 7/2003 |
| JP | 2005-218244 A | 8/2005 |
| JP | 2006-5998 A | 1/2006 |
| JP | 2006-54979 A | 2/2006 |
| JP | 2006-113155 A | 4/2006 |
| JP | 2006-113874 A | 4/2006 |
| JP | 2006-304529 A | 11/2006 |

OTHER PUBLICATIONS

U.S. Appl. No. 12/082,948, filed Apr. 15, 2008, Entitled "Driving Device Capable of Transferring Vibrations Generated by an Electro-Mechanical Transducer to a Vibration Friction Portion with a High Degree of Efficiency" Inventor: Yamada et al.

U.S. Appl. No. 12/148,252, filed Apr. 17, 2008, Entitled "Driving Device Having Suitable Stationary Member as Material" Inventor: Yamada et al.

U.S. Appl. No. 12/148,257, filed Apr. 17, 2008, Entitled "Driving Device Capable of Reducing Height Thereof" Inventor: Yamada et al.

U.S. Appl. No. 12/148,253, filed Apr. 17, 2008, Entitled "Method of Driving a Driving Device" Inventor: Tanaka et al.

U.S. Appl. No. 12/148,793, filed Apr. 22, 2008, Entitled "Position Detecting Device Capable of Improving Detection Accuracy" Inventor: Tanaka et al.

Extended European Search Report dated Sep. 9, 2008 issued in European Application No. 08154985.9-2213 (which is a counterpart of related U.S. Appl. No. 12/148,793).

Extended European Search Report dated Sep. 1, 2009 (8 pages), issued in European Application Serial No. 08154734.1 (which is a counterpart of U.S. Appl. No. 12/082,948).

Extended European Search Report and Written Opinion dated Aug. 31, 2009 issued in a counterpart European application No. 08 154485. (8 pages).

* cited by examiner

DRIVING DEVICE CAPABLE OF IMPROVING A SHOCK AND VIBRATION RESISTANCE THEREOF

This application is based upon and claims the benefit of priority from Japanese Patent Application JP 2007-107717, filed on Apr. 17, 2007, the disclosure of which is incorporated herein in its entirety by reference.

BACKGROUND OF THE INVENTION

This invention relates to a driving device (a linear actuator) and, in particular, to a driving device where an electro-mechanical transducer such a piezoelectric element is used as a driving source of the driving device (the linear actuator).

Previously, linear actuators (driving devices) using electro-mechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element. Japanese Patent No. 3180557 (JP-B 3180557) (which will be also called a third patent document), which corresponds also to U.S. Pat. No. 5,589,723, discloses a driving apparatus including the friction member composed of a metal and the driving member made of a fiber-reinforced resin composite.

Japanese Unexamined Patent Application Publication No. 2006-54979 (JP-A 2006-54979) (which will be also called a fourth patent document) discloses an actuator which is capable of moving a driven member with stability and with precision. The actuator disclosed in JP-A 2006-54979 comprises a first piezoelectric element, a diving member mounted to the first piezoelectric element, a driven member which is frictionally coupled to the driving member and which extends in a driving direction, and a second piezoelectric element for engaging the driving member with the driven member and for releasing a friction engagement between the driving member and the driven member. Specifically, the actuator disclosed in JP-A 2006-54979 comprises a pair of first piezoelectric elements for driving, a second piezoelectric element for engagement, a pair of driving members, and a pressure spring. The pair of first piezoelectric elements and the pair of driving members are disposed at both sides with the driven member sandwiched between them. The pair of driving members have a distance which is expanded or narrowed by the second piezoelectric element. By the second piezoelectric element, the friction engagement between the pair of the driving members and the driven member is ensured or released.

Japanese Unexamined Patent Application Publication No. H9-191665 (JP-A 9-191665) (which will be also called a fifth patent document), which corresponds to U.S. Pat. No. 5,890,391, discloses a linear drive mechanism using an electromechanical conversion element which is insensitive to elastic deformation of a constituent member. The linear driving mechanism disclosed in JP-A 9-191665 comprises the electromechanical conversion element, a working member which is fixedly connected to the electromechanical conversion element and which displaces with the electromechanical conversion element, a driving member frictionally coupled to the working member, a driven member coupled to the driving member, and a driving pulse generating arrangement for causing expansion/contraction displacement to the electromechanical conversion element.

There are problems in the above-mentioned first through forth patent documents as follows.

In the driving device disclosed in the first patent document, inasmuch as the lens holder (the driven member, the moving portion) is movably supported to the guide bar (the driving member, the vibration friction portion) bonded to the piezoelectric element, the guide bar (the driving member, the vibration friction portion) has a length longer than that of the lens holder (the driven member, the moving portion) and the guide bar (the driving member, the vibration portion) is easy to produce an inclination caused by a reciprocating motion. In addition, the longer a moving distance of the lens holder (the driven member, the moving portion), the longer the guide bar (the driving member, the vibration friction member) and it results in easily producing an unnecessary vibration mode. Furthermore, inasmuch as the friction engagement portion lies on an extension of a coupling portion between the piezoelectric element and the guide bar (the driving member, the vibration friction member), it counts against a reduction in profile thereof.

In also the driving apparatus disclosed in the second patent document, inasmuch as the driving shaft (the driving member, the vibration friction portion) extends in an expansion/contraction direction of the electro-mechanical transducer, the driving shaft (the driving member, the vibration friction portion) has a length longer than that of the a zoom lens barrel (the driven member, the moving portion) and the driving shaft (the driving member, the vibration friction portion) is easy to produce an inclination caused by a reciprocating motion. In addition, the longer a moving distance of the zoom lens barrel (the driven member, the moving portion), the longer the driving shaft (the driving member, the vibration friction portion) and it results in easily producing an unnecessary vibration mode. Furthermore, inasmuch as the friction engagement portion lies on an extension of a coupling portion between the electro-mechanical transducer and the driving shaft (the driving member, the vibration friction member), it counts against a reduction in profile thereof. In addition, inasmuch as the driving apparatus has structure where the zoom lens barrel (the driven member, the moving portion) is cantilevered by the driving shaft (the driving member, the vibration friction portion), it is impossible to mechanically move a large weight object such as the lens.

The third patent document may just disclose the driving apparatus where the driving shaft (the driving member, the vibration friction portion) is made of the fiber-reinforced resin composite and has a basic structure which is similar to that illustrated in the second patent document. It has therefore disadvantage which is similar to that of the second patent document.

Although the driving member (the vibration friction portion) has a length which is shorter than that of the driven member (the moving portion) in the actuator disclosed in the fourth patent document, the actuator disclosed in the fourth patent document is disadvantageous in that it is complicated in structure and it is impossible to reduce a size thereof because it comprises a plurality of piezoelectric elements.

On the other hand, the fifth patent document discloses the linear drive mechanism where the moving member (the moving portion) has a rod shape and the working member (a vibration friction portion) has a complicated shape. Incidentally, a laminated piezoelectric element is used as the electro-mechanical conversion element. The laminated piezoelectric element has structure where it increases in strength in a laminated direction and it is very weak against shock (or impact), vibrations, or the like in a lateral direction perpendicular to the laminated direction. The linear drive mechanism disclosed in the fifth patent document does not take measures against such as shock or the like.

SUMMARY OF THE INVENTION

It is therefore an exemplary object of the present invention to provide a driving device which is capable of improving a shock and vibration resistance thereof.

Other objects of this invention will become clear as the description proceeds.

On describing the gist of an exemplary aspect of this invention, it is possible to be understood that a driving device includes an electro-mechanical transducer having first and second end portions opposite to each other in an expansion/contraction direction, a static member coupled to the first end portion of the electro-mechanical transducer, a vibration friction portion coupled to the second end portion of the electro-mechanical transducer, and a rod-shaped moving portion frictionally coupled to the vibration friction portion. The rod-shaped moving portion is movable in the expansion/contraction direction of the electro-mechanical transducer. According to the exemplary aspect of this invention, the driving device includes an outer sheath for covering the driving device and an attitude retaining arrangement for retaining an attitude of the driving device with respect to the outer sheath.

DESCRIPTION OF THE EXEMPLARY EMBODIMENTS

Figure 1:
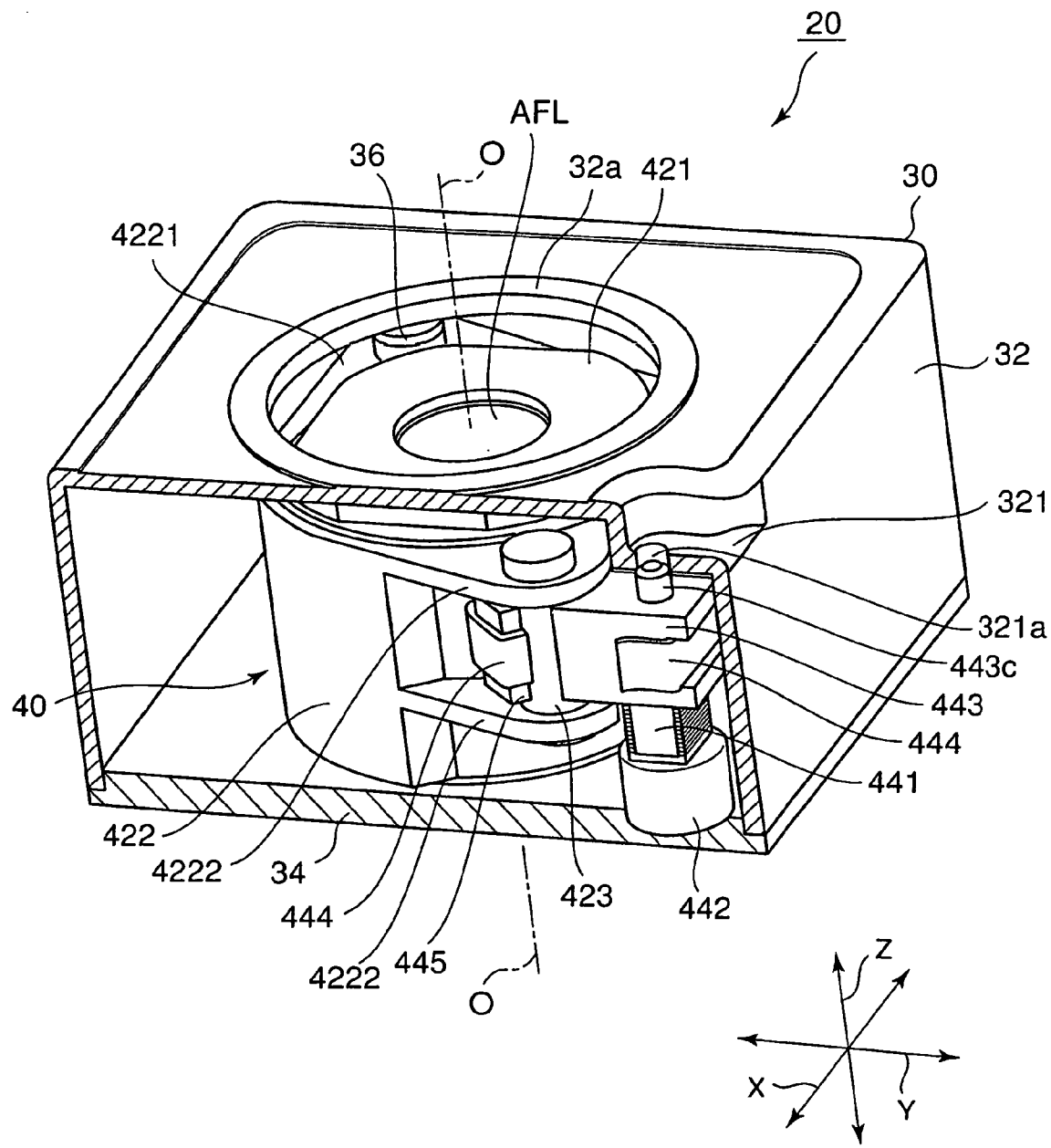
FIG. 1 is a partial cross sectional perspective view of a driving device according to a first exemplary embodiment of this invention.
Figure 2:
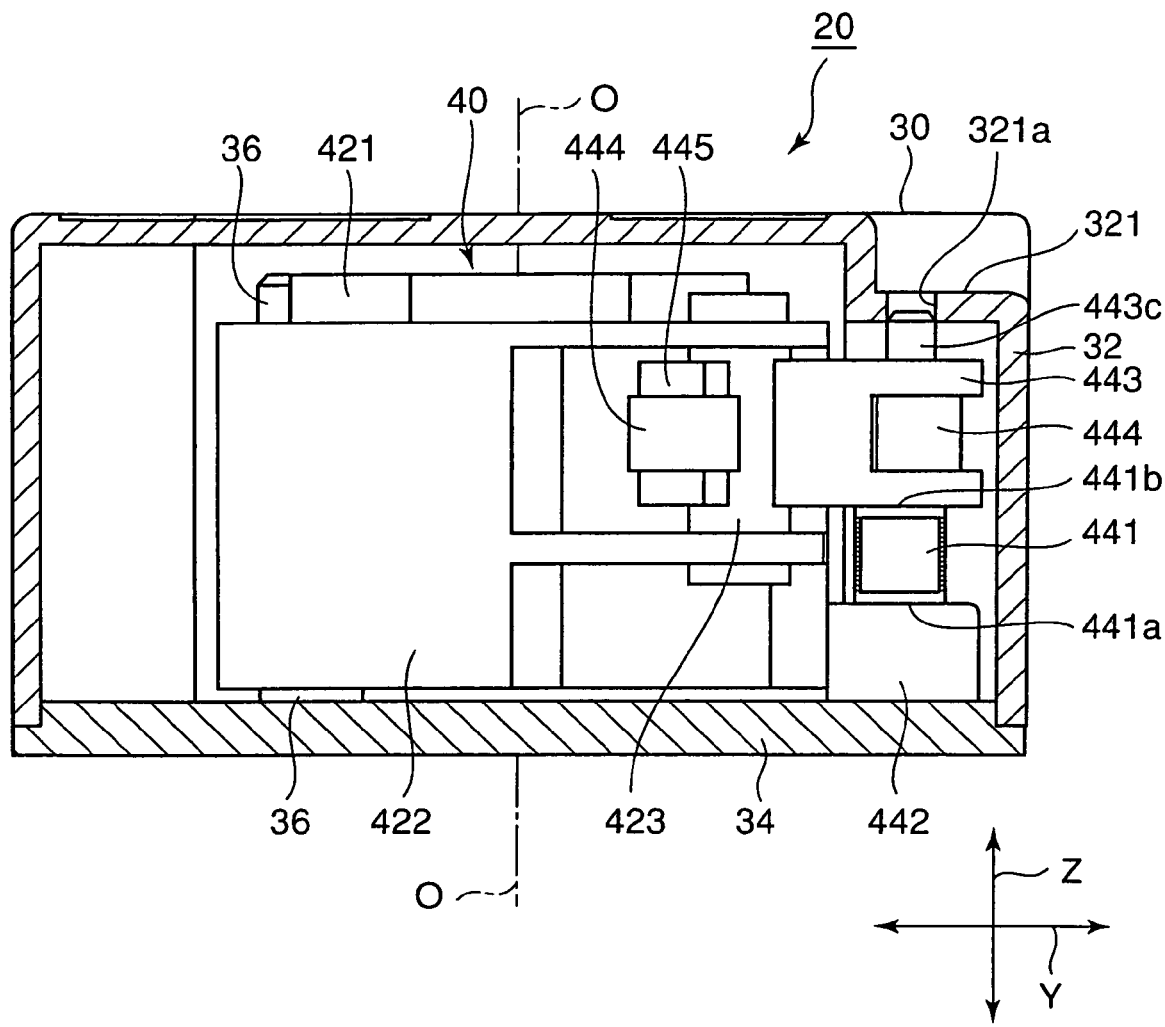
FIG. 2 is a sectional view of the driving device illustrated in FIG. 1.
Figure 3:
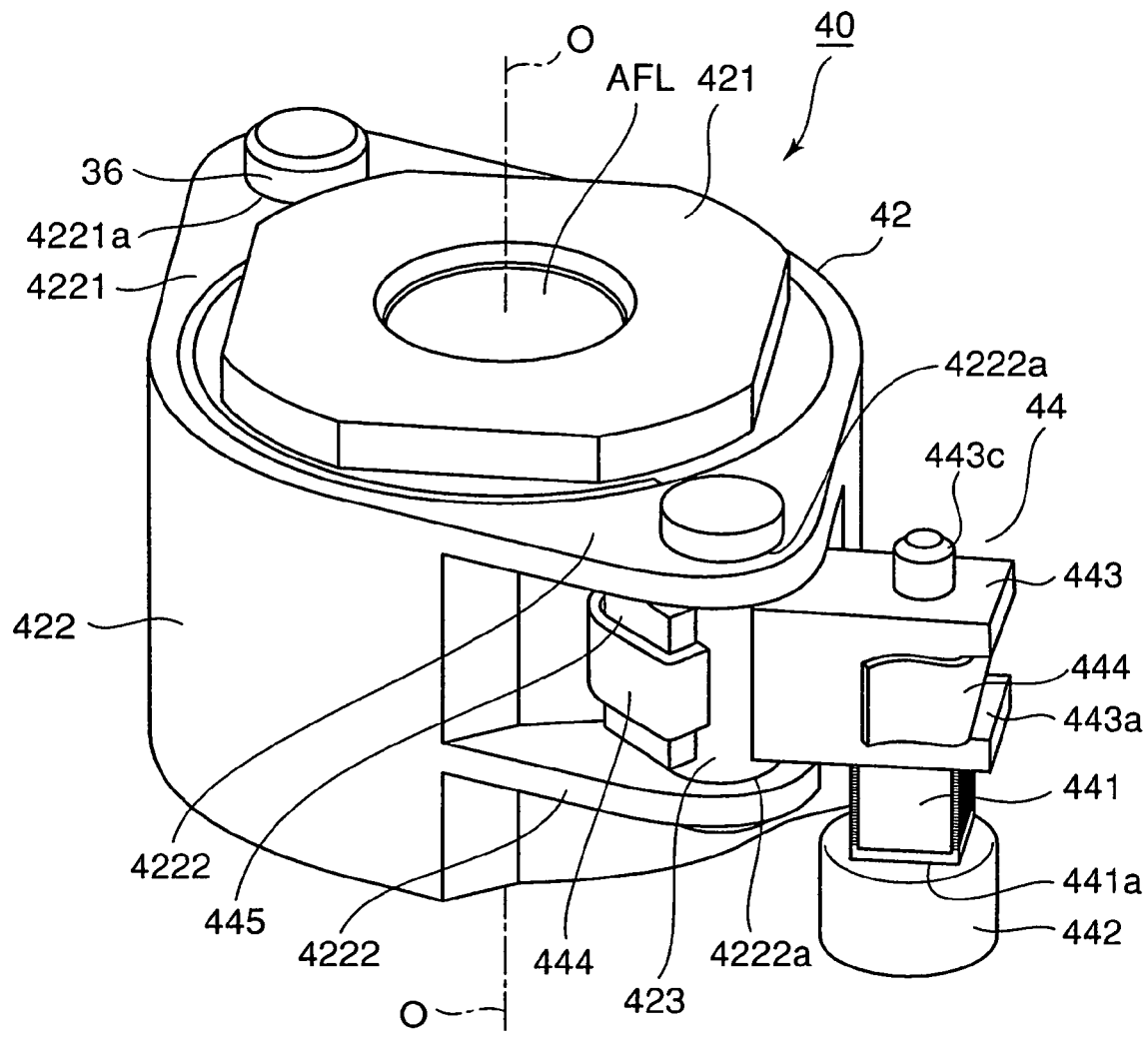
FIG. 3 is an external perspective view showing an auto-focus lens driving unit provided within the driving device illustrated in FIG. 1.
Figure 3:
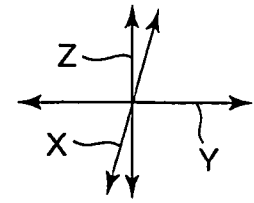
Figure 4:
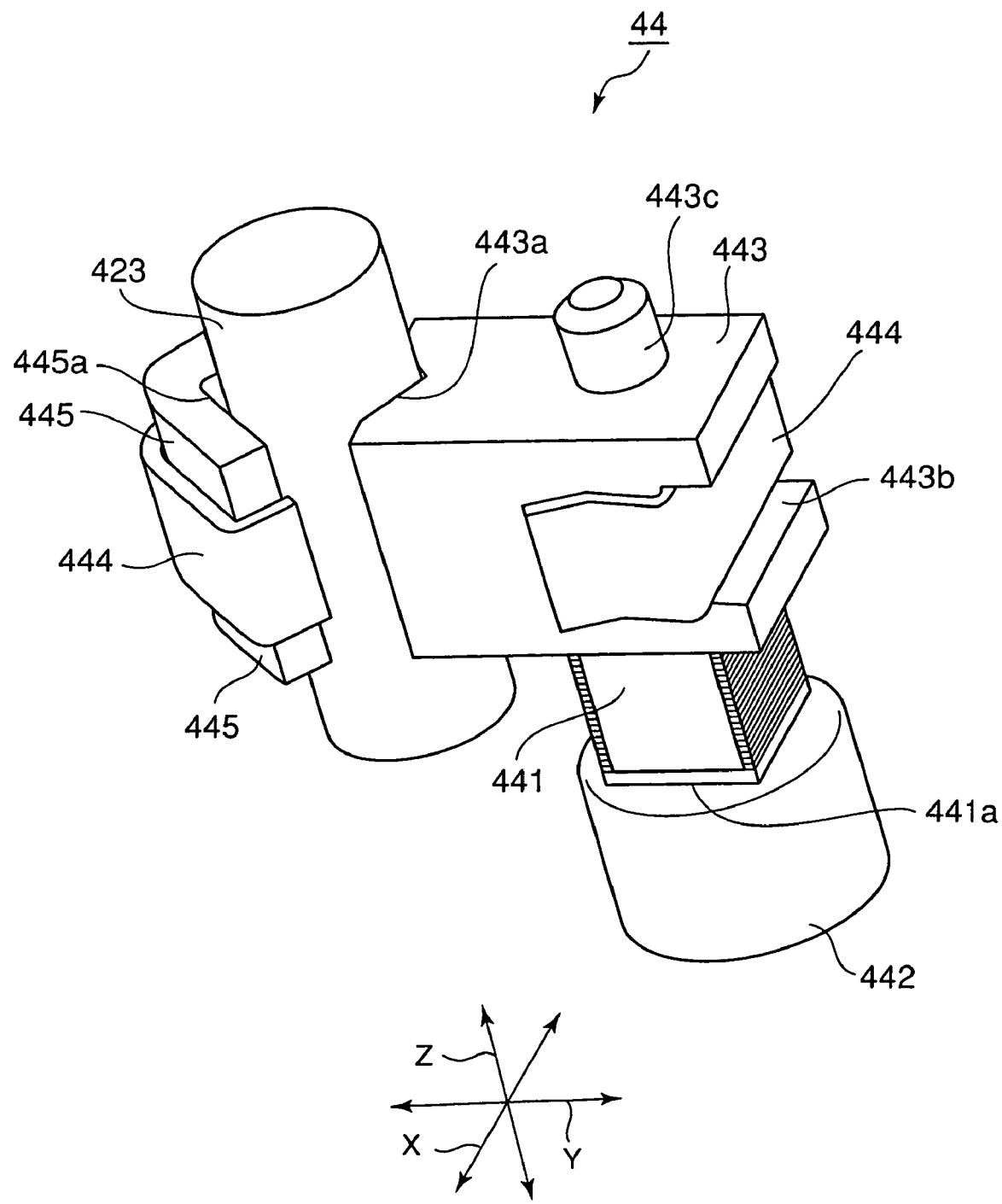
FIG. 4 is a perspective view of a lens driving portion of the auto-focus lens driving unit illustrated in FIG. 3 together with a rod-shaped moving shaft.
Figure 5:
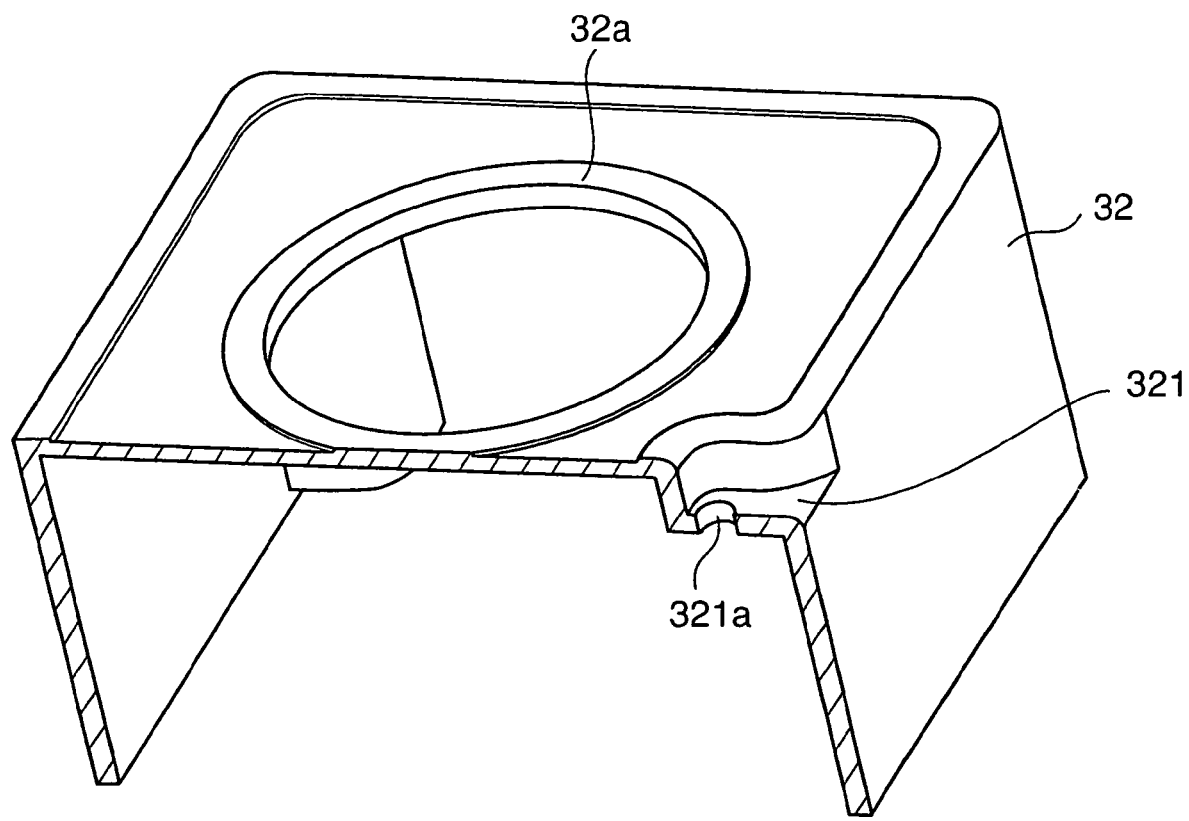
FIG. 5 is a partial cross sectional perspective view showing a cup-shaped upper cover of a cabinet (an outer sheath) for use in the driving device illustrated in FIG. 1.

Referring to FIGS. 1 though 5, the description will proceed to a driving device 20 according to a first exemplary embodiment of this invention. FIG. 1 is a partial cross sectional perspective view of the driving device 20 according to the first exemplary embodiment of this invention. FIG. 2 is a sectional view of the driving device 20 illustrated in FIG. 1. FIG. 3 is an external perspective view showing an auto-focus lens driving unit 40 provided within the driving device 20 illustrated in FIG. 1. FIG. 4 is a perspective view of a lens driving portion 44 of the auto-focus lens driving unit 40 illustrated in FIG. 3 together with a rod-shaped moving shaft 423. FIG. 5 is a partial cross sectional perspective view showing a cup-shaped upper cover 32 of a cabinet (an outer sheath) 30 for use in the driving device 20 illustrated in FIG. 1.

Herein, in the manner shown in FIGS. 1 to 5, an orthogonal coordinate system (X, Y, Z) is used. In a state illustrated in FIGS. 1 to 5, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 to 5, the up-and-down direction Z is a direction of an optical axis O of a lens.

As shown in FIG. 1, the driving device 20 is covered with the cabinet (the outer sheath) 30 having a substantially rectangular parallelepiped shape. In the cabinet (the outer sheath) 30, the auto-focus lens driving unit 40 (see FIG. 3) which will later be described is disposed. The cabinet (the outer sheath) 30 includes the cap-shaped upper cover 32 and a lower base 34. On the lower base 34 of the cabinet 30, a static member (a weight) 442 which will later be described is mounted. The upper cover 32 has an upper surface comprising a cylinder portion 32a having a center axis which is the optical axis O.

On the other hand, although illustration is not made, the lower base 34 had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

In the cabinet (the outer sheath) 30, a guide shaft 36 is disposed at a left and back side. The guide shaft 36 extends in parallel with the optical axis O. The guide shaft 36 stands on the lower base 34 of the cabinet 30. With the optical axis O sandwiched, the rod-shaped moving portion (a movable shaft) 423, which will later be described, is disposed at a right and front side which is opposite side with respect to the guide shaft 36. That is, the guide shaft 36 and the moving shaft 423 are disposed at positions which are rotationally symmetric about the optical axis O.

As shown in FIG. 3, the auto-focus lens driving unit 40 comprises a lens movable portion 42 and a lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIG. 3) 4221 which extend in a radial direction outwards at the left and back side. The pair of extending portions 4221 have through holes 4221a through which the above-mentioned guide shaft 36 passes. In addition, the movable barrel 422 comprises a pair of extending portions 4222 which extend in the radial direction outwards at the right and front side. The pair of extending portions 4222 have fitting holes through which the rod-shaped movable shaft 423 passes and to which the rod-shaped moving shaft 423 is fixed. With this structure, the lens movable portion 42 is movable in the direction of the optical axis O with respect to the cabinet 30.

The lens driving portion 44 slidably supports the lens movable portion 42 in the direction of the optical axis O and drives the lens movable portion 42 in the manner which will later be described.

Referring to FIG. 4 in addition to FIG. 3, the description will proceed to the lens driving portion 44 of the auto-focus lens driving unit 40.

The lens driving portion 44 comprises a laminated piezoelectric element 441 serving as an electro-mechanical transducer, the static member (the weight) 442, and a vibration friction portion 443. The laminated piezoelectric element 441 has a structure where a plurality of piezoelectric layers are laminated in the optical direction O. As shown in FIG. 2, the laminated piezoelectric element 441 has a first end portion (a lower end portion) 441a and a second end portion (an upper end portion) 441b which are disposed to each other in the expansion/contraction direction. The static member (the weight) 442 is coupled to the first end portion (the lower end portion) 441a of the laminated piezoelectric element 441 using an adhesive agent or the like. The vibration friction portion 443 is coupled to the second end portion (the upper end portion) 441b of the laminated piezoelectric element 441 using the adhesive agent or the like. A combination of the laminated piezoelectric element 441 and the static member 442 is called an piezoelectric unit.

The rod-shaped moving shaft 423 is frictionally coupled to the vibration friction portion 443. As shown in FIG. 4, the vibration friction portion 443 has a groove 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a V-shape in cross section at a contact portion between the pad 445 and the rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

The lens driving portion 44 and the lens moving portion 42 are disposed in parallel with each other in the optical axis O as shown in FIG. 3. Accordingly, it is possible to lower a height of the auto-focus lens driving unit 40. As a result, it is possible to also lower a height of the driving device 20.

Referring to FIGS. 1 to 5, the description will proceed to an attitude retaining arrangement or means provided in the driving device 20. The attitude retaining arrangement is for retaining an attitude of the driving device 20 (the auto-focus lens driving unit 40) with respect to the outer sheath (the cabinet) 30.

The vibration friction portion 443 comprises a protrusion 443c for projecting in the expansion/contraction direction of the laminated piezoelectric element (the electro-mechanical transducer) 441.

On the other hand, as shown in FIG. 5, the upper cover 32 of the outer sheath (the cabinet) 30 comprises a concave portion 321 which is bowed downwards at a position of a roof that corresponds to the lens driving portion 44. The concave portion 321 has a hole portion 321a which is bored in the concave portion 321. The protrusion 443c is inserted in the hole portion 321a.

That is, a combination of the protrusion 443c provided in the vibration friction portion 443 and the hole portion 321a bored in the outer sheath (the cabinet) 30 serves as the above-mentioned attitude retaining arrangement. Inasmuch as the attitude of the lens driving portion 44 (the driving device 20) is retained with respect to the outer sheath (the cabinet) 30 by means of the attitude retaining arrangement, it is possible to improve a shock and vibration resistance of the driving device 20.

Figures 6A, 6B:
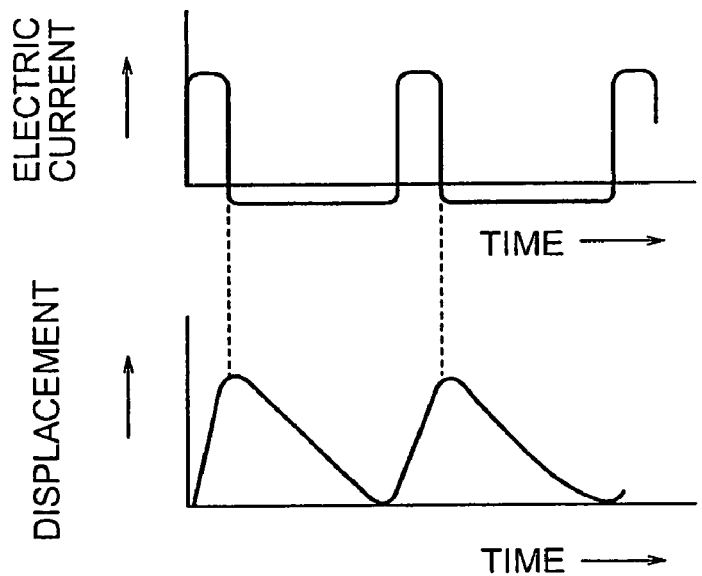
FIG. 6A is a waveform diagram for use in describing a current supplied to a laminated piezoelectric element.
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(a) and 8(b) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce a sawtooth displacements (expansion and contraction) (FIG. 6B).

Referring to FIG. 3 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-anddown direction Z) upwards. In this event, the lens movable portion 42 does not moves. This is because, caused by the inertial force, the lens movable portion 42 substantially remains in its position by overcoming the friction force between the vibration friction portion 443 and the rod-shaped moving shaft 423.

Subsequently, it will be assumed that the constant current flows the laminated piezoelectric element 441 in the negative or reverse direction as shown in FIG. 6A. In this event, the laminated piezoelectric element 441 slowly produces the contraction displacement in the thickness direction as shown in FIG. 6B. As a result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Figure 7:
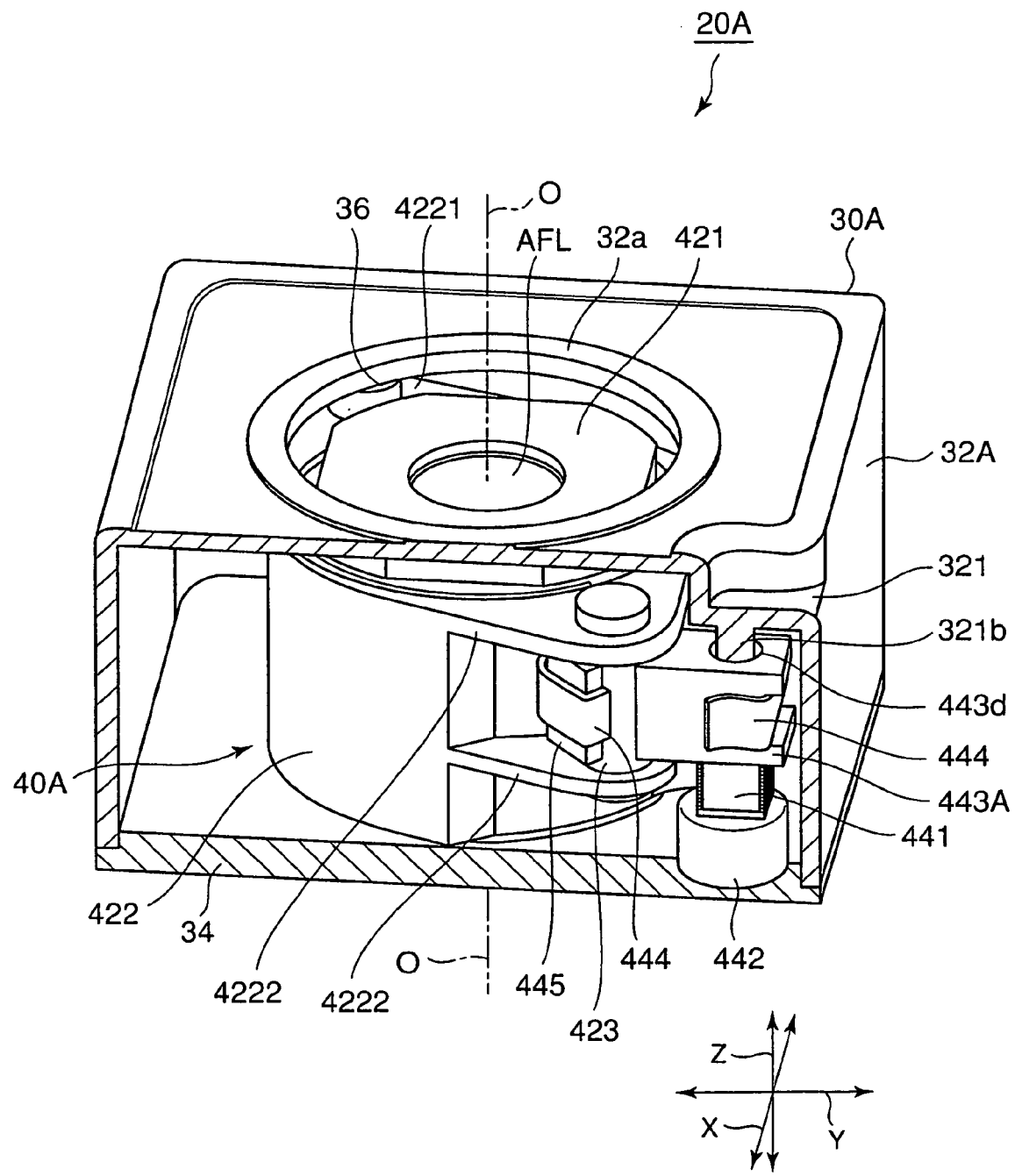
FIG. 7 is a partial cross sectional perspective view of a driving device according to a second exemplary embodiment of this invention.
Figure 8:
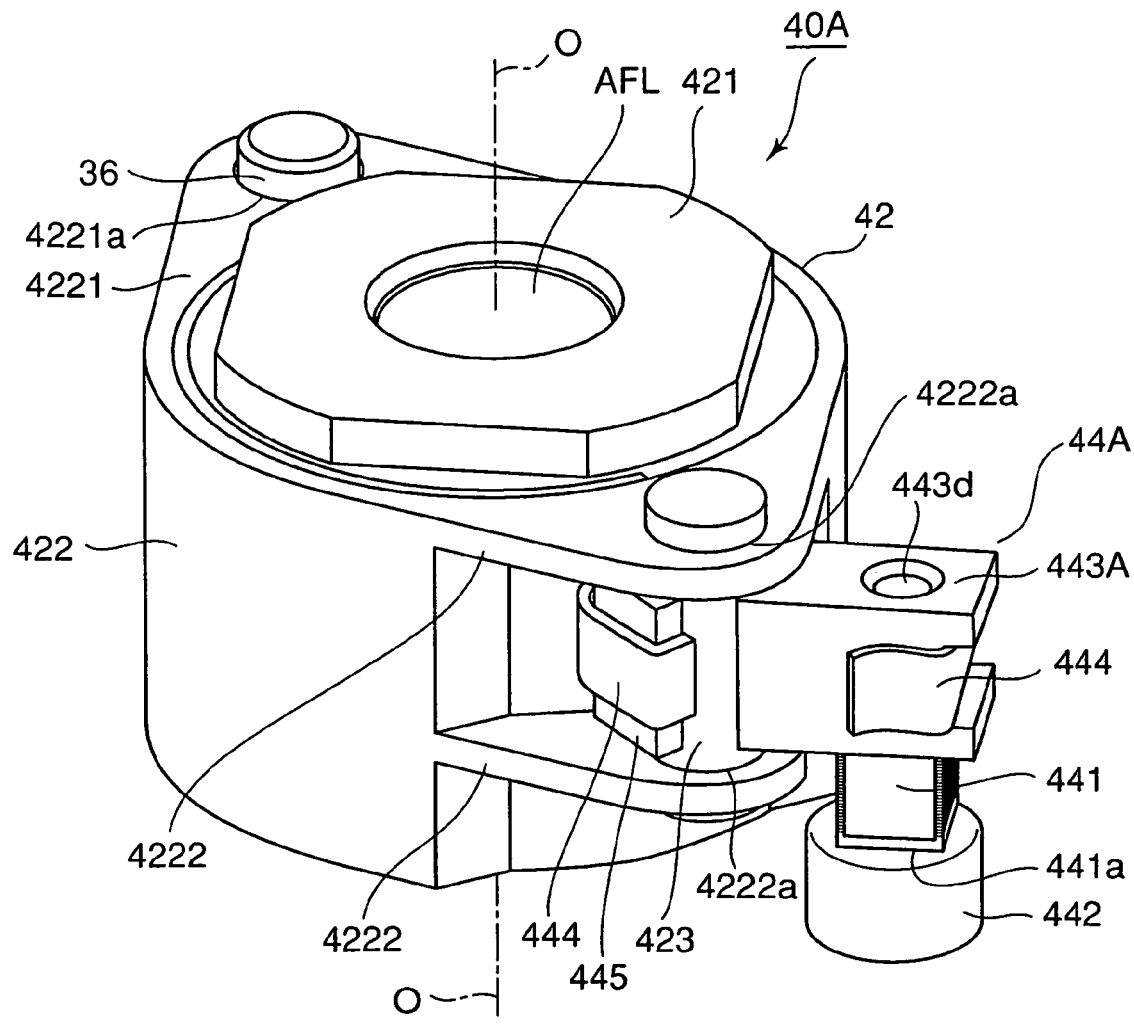
FIG. 8 is an external perspective view showing an auto-focus lens driving unit provided within the driving device illustrated in FIG. 7.
Figure 9:
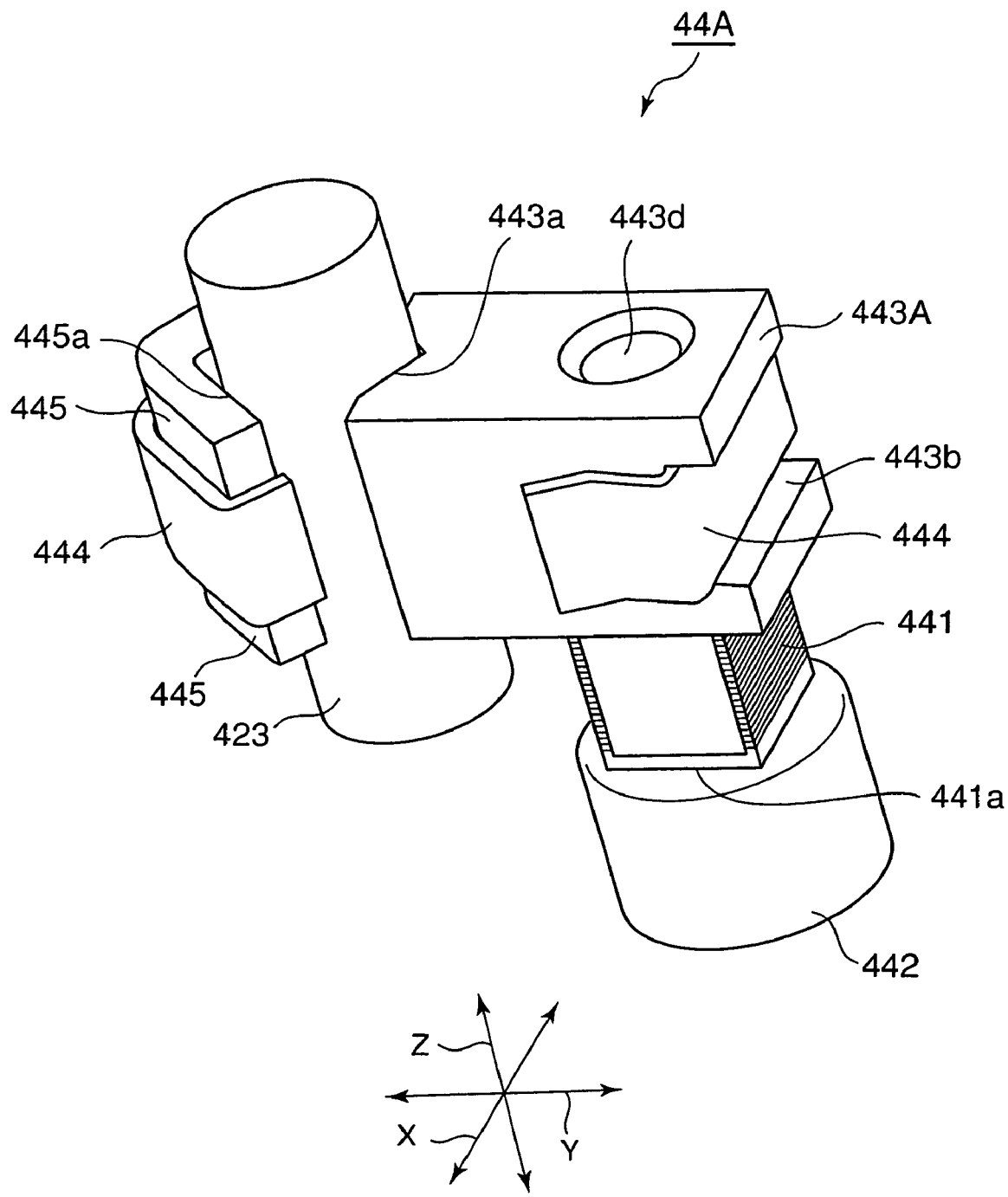
FIG. 9 is a perspective view of a lens driving portion of the auto-focus lens driving unit illustrated in FIG. 8 together with a rod-shaped moving shaft.
Figure 10:
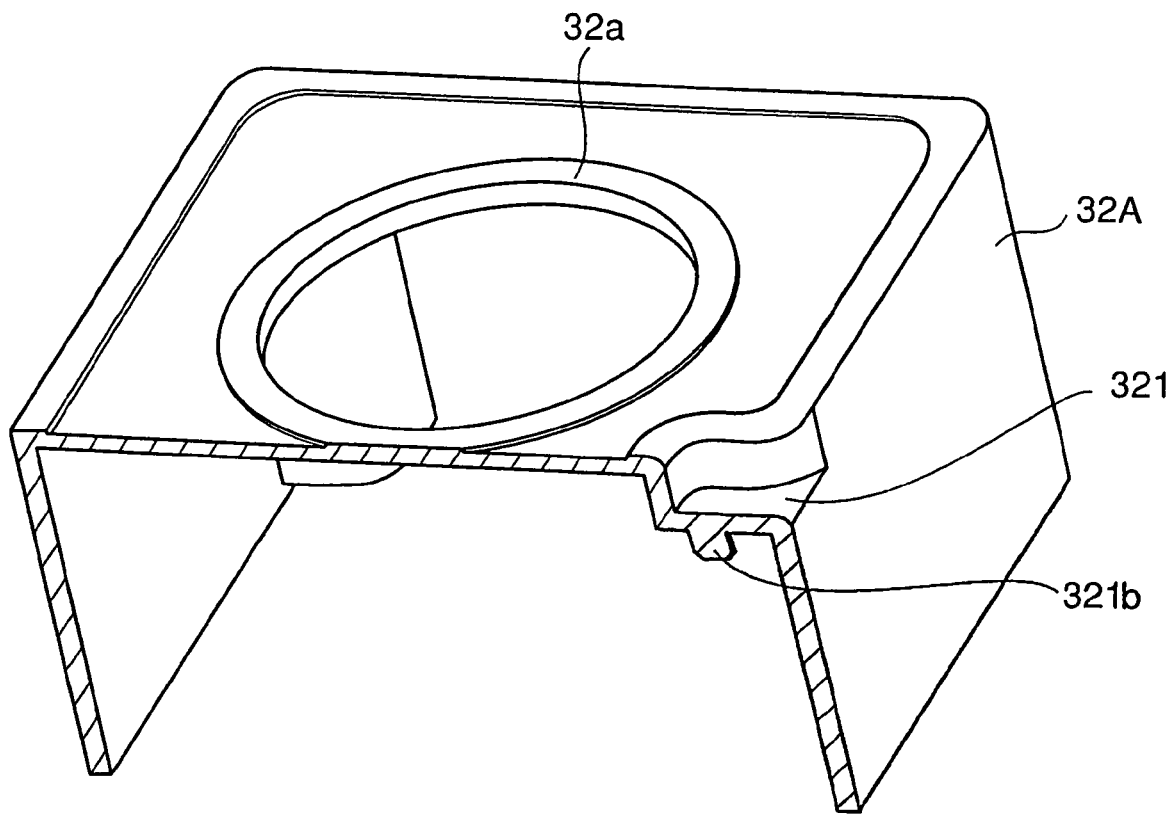
FIG. 10 is a partial cross sectional perspective view showing a cup-shaped upper cover of a cabinet (an outer sheath) for use in the driving device illustrated in FIG. 7.

Referring to FIGS. 7 though 10, the description will proceed to a driving device 20A according to a second exemplary embodiment of this invention. FIG. 7 is a partial cross sectional perspective view of the driving device 20A according to the second exemplary embodiment of this invention. FIG. 8 is an external perspective view showing an auto-focus lens driving unit 40A provided within the driving device 20A illustrated in FIG. 7. FIG. 9 is a perspective view of a lens driving portion 44A of the auto-focus lens driving unit 40A illustrated in FIG. 8 together with a rod-shaped moving shaft 423. FIG. 10 is a partial cross sectional perspective view showing a cup-shaped upper cover 32A of a cabinet (an outer sheath) 30A for use in the driving device 20A illustrated in FIG. 7.

Herein again, in the manner shown in FIGS. 7 to 10, an orthogonal coordinate system (X, Y, Z) is used. In a state illustrated in FIGS. 7 to 10, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 7 to 10, the up-and-down direction Z is a direction of an optical axis O of a lens.

The driving device 20A is similar in structure to the driving device 20 illustrated in FIGS. 1 to 5 except that the attitude retaining arrangement is different from that illustrated in FIGS. 1 to 5 as will later become clear. Accordingly, the same reference symbols are attached to those which are similar to parts (components) of the driving device 20 illustrated in FIGS. 1 to 5 and description will be made as regards different points.

The vibration friction portion 443A has a hole 443d which is bored in the vibration friction portion 443A in the expansion/contraction direction of the laminated piezoelectric element (the electro-mechanical transducer) 441. On the other hand, as shown in FIG. 10, the concave portion 321 of the upper cover 321A of the outer sheath (the cabinet) 30 has a production 321b which is inserted in the above-mentioned hole 443d.

That is, a combination of the hole 443d bored in the vibration friction portion 443A and the protrusion 321d provided in the outer sheath (the cabinet) 30A serves as the above-mentioned attitude retaining arrangement. Inasmuch as the attitude of the lens driving portion 44A (the driving device 20A) is retained with respect to the outer sheath (the cabinet) 30A by means of the attitude retaining arrangement, it is possible to improve a shock and vibration resistance of the driving device 20A.

Figure 11:
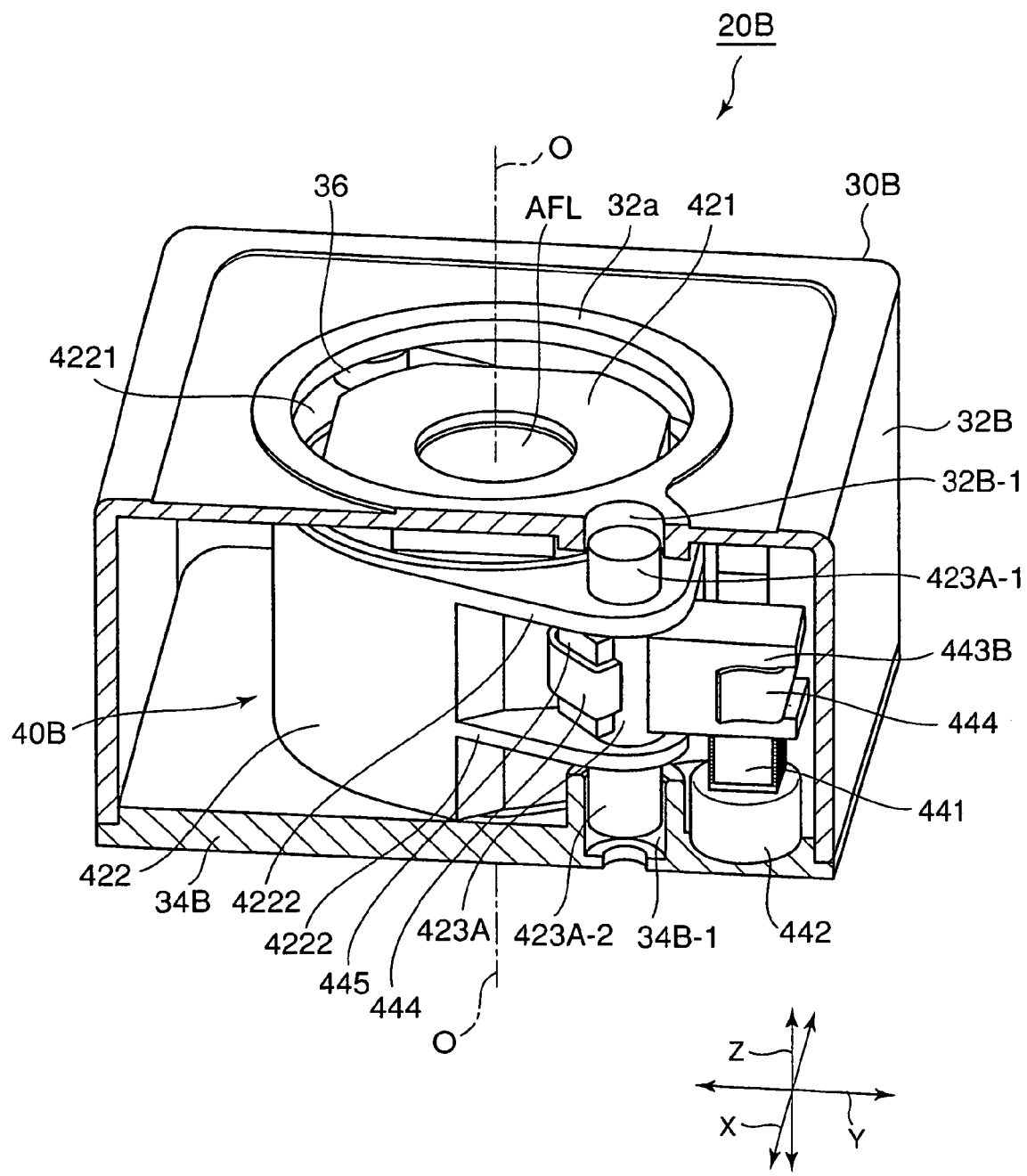
FIG. 11 is a partial cross sectional perspective view of a driving device according to a third exemplary embodiment of this invention.
Figure 12:
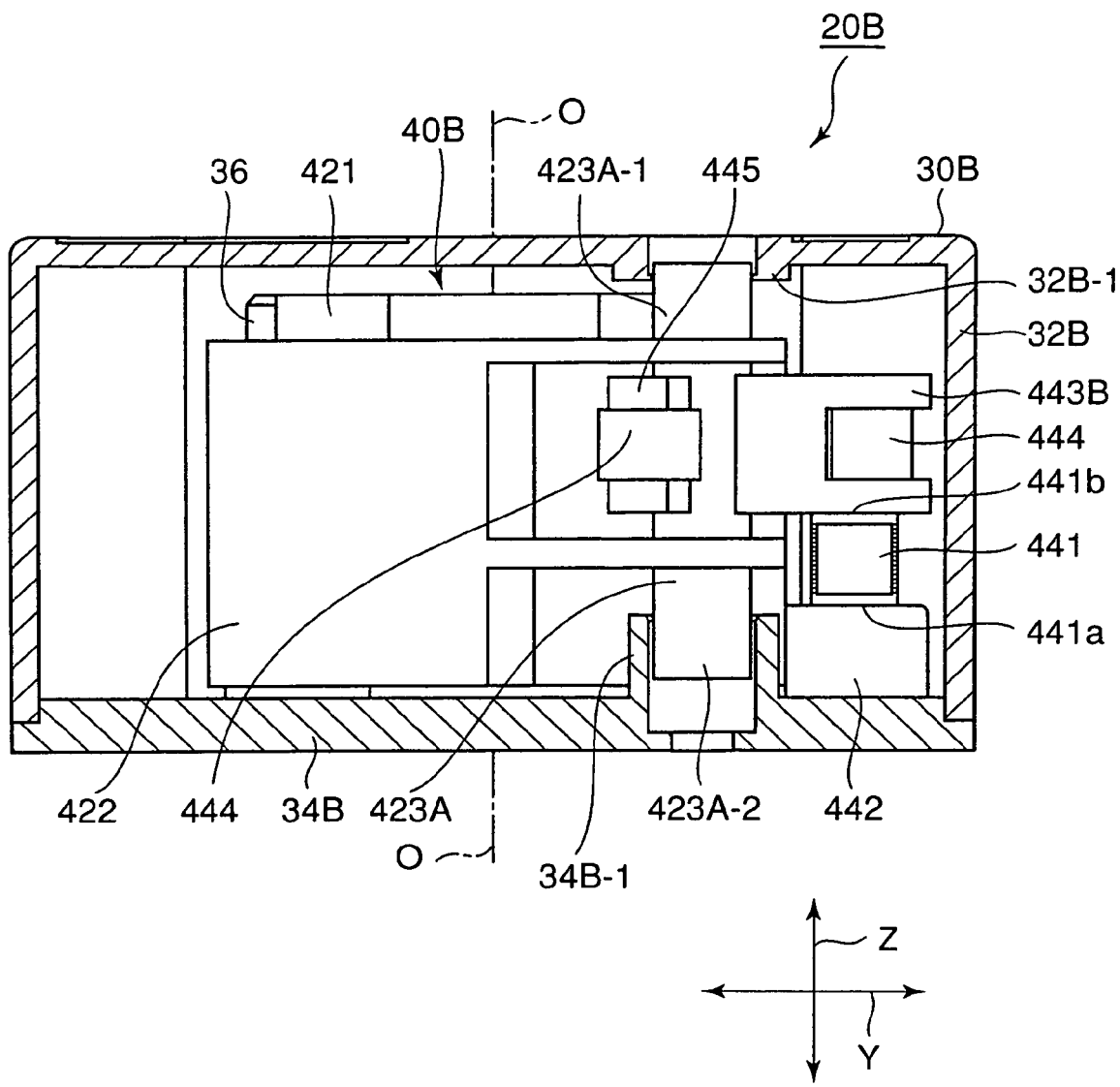
FIG. 12 is a sectional view of the driving device illustrated in FIG. 11.
Figure 13:
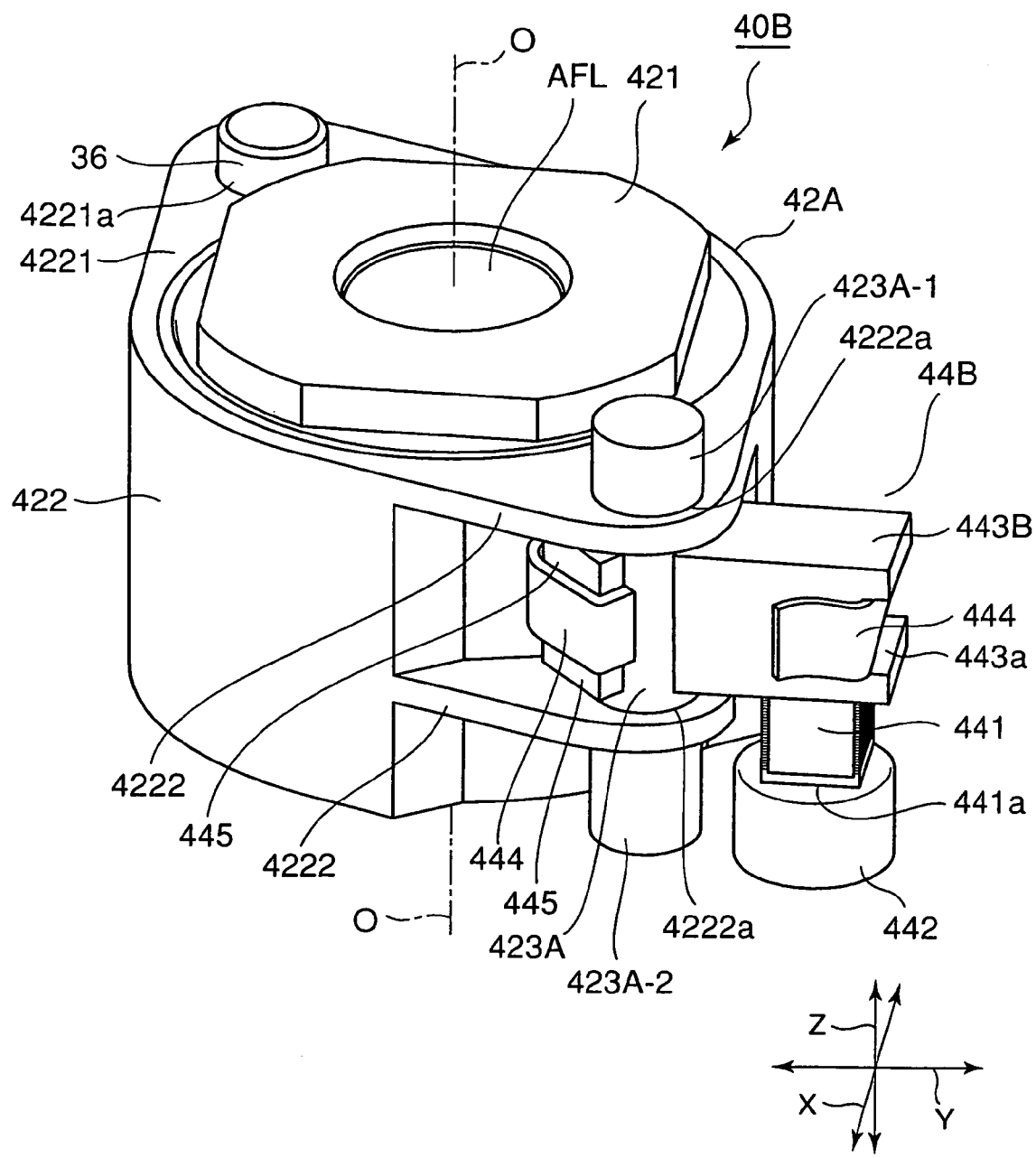
FIG. 13 is an external perspective view showing an auto-focus lens driving unit provided within the driving device 20B illustrated in FIG. 11.
Figure 14:
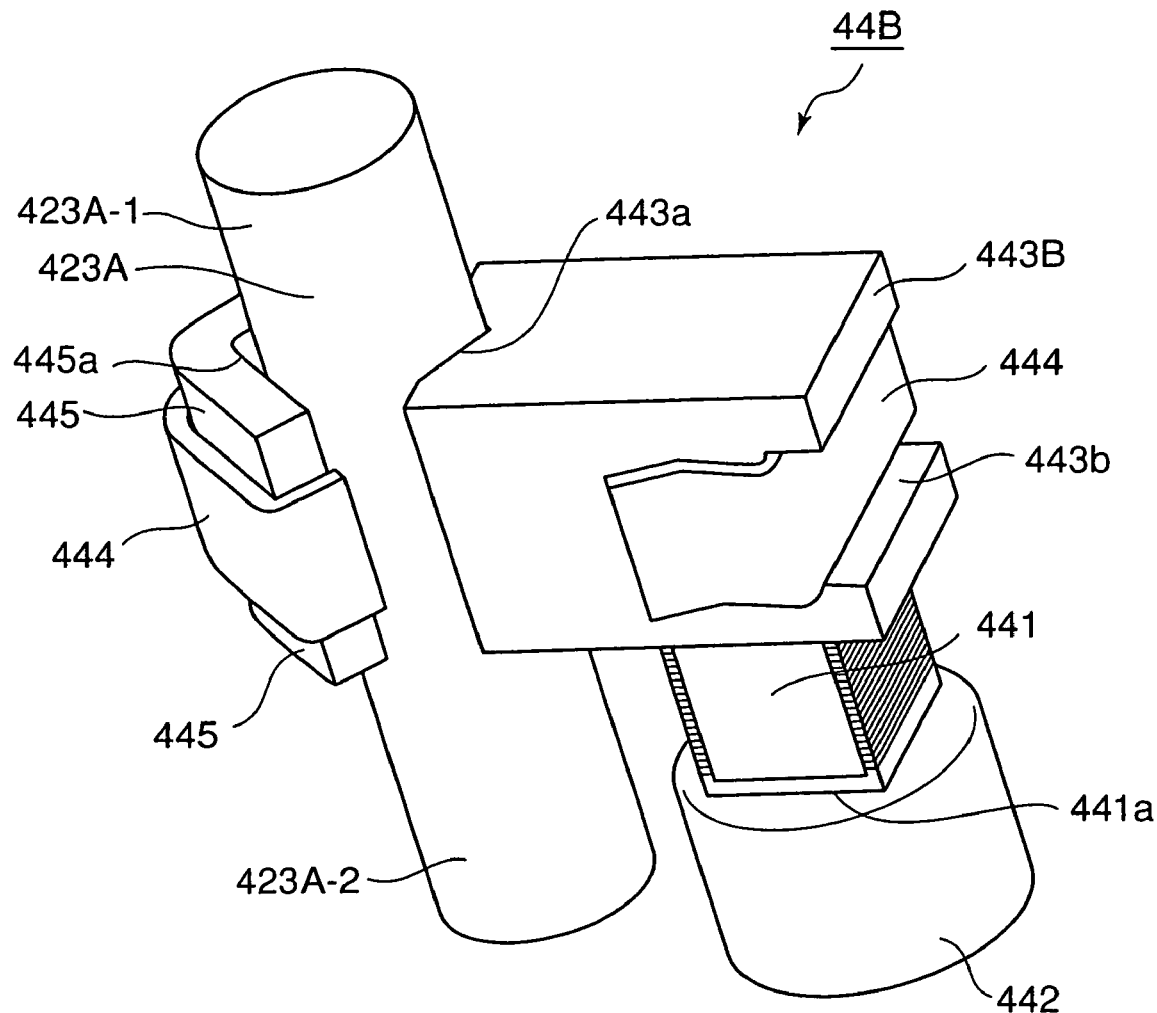
FIG. 14 is a perspective view of a lens driving portion of the auto-focus lens driving unit illustrated in FIG. 13 together with a rod-shaped moving shaft.

Referring to FIGS. 11 though 14, the description will proceed to a driving device 20B according to a third exemplary embodiment of this invention. FIG. 11 is a partial cross sectional perspective view of the driving device 20B according to the third exemplary embodiment of this invention. FIG. 12 is a sectional view of the driving device 20B illustrated in FIG. 11. FIG. 13 is an external perspective view showing an auto-focus lens driving unit 40B provided within the driving device 20B illustrated in FIG. 11. FIG. 14 is a perspective view of a lens driving portion 44B of the auto-focus lens driving unit 40B illustrated in FIG. 13 together with a rod-shaped moving shaft 423A.

Herein again, in the manner shown in FIGS. 11 to 14, an orthogonal coordinate system (X, Y, Z) is used. In a state illustrated in FIGS. 11 to 14, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 11 to 14, the up-and-down direction Z is a direction of an optical axis O of a lens.

The driving device 20B is similar in structure to the driving device 20 illustrated in FIGS. 1 to 5 except that the attitude retaining arrangement is different from that illustrated in FIGS. 1 to 5 as will later become clear. Accordingly, the same reference symbols are attached to those which are similar to parts (components) of the driving device 20 illustrated in FIGS. 1 to 5 and description will be made as regards different points.

As shown in FIG. 14, a vibration friction portion 443B is different from each of the vibration friction portion 443 and 443A and does not have the protrusion 443c or the hole 443d. Alternatively, the rod-shaped moving shaft 423A comprises an upper extending portion 423A-1 and a lower extending portion 423A-2. The upper extending portion 423A-1 extends from an upper end of the rod-shaped moving shaft 423A in the expansion/contraction direction of the laminated piezoelectric element (the electro-mechanical transducer) 441 upwards. The lower extending portion 423A-2 extends from a lower end of the rod-shaped moving shaft 423A in the expansion/contraction direction of the laminated piezoelectric element (the electro-mechanical transducer) 441 downwards. A combination of the upper extending portion 423A-1 and the lower extending portion 423A-2 acts as extending portions for extending from both ends of the rod-shaped moving portion 423A in the expansion/contraction direction of the laminated piezoelectric element (the electro-mechanical transducer) 441.

On the other hand, as shown in FIGS. 11 and 12, an upper cover 32B of an outer sheath (the cabinet) 30B has an upper receiving portion 32B-1 for receiving the above-mentioned upper extending portion 423A-1 and a lower base 34B of the outer sheath (the cabinet) 30B has a lower receiving portion 34B-1 for receiving the above-mentioned lower extending portion 423A-2. At any rate, a combination of the upper receiving portion 32B-1 and the lower receiving portion 34B-1 acts as receiving portions, provided in the outer sheath (the cabinet) 30B, for receiving the above-mentioned extending portions (423A-1, 423A-2) so as to be movable the moving portion 423B in the expansion/contraction direction of the laminated piezoelectric element (the electro-mechanical transducer) 441. The receiving portions (32B-1, 34B-1) have a function for stabilizing a position of the lens movable portion 42A in a plane having a normal which is the moving shaft 423A. In other words, the receiving portions (32B-1, 34B-1) have the function for stabilizing the inclination of the moving shaft 423A of the lens movable portion 42A.

That is, a combination of the extending portions (423A-1, 423A-2) and the receiving portions (32B-1, 34B-1) serves as the above-mentioned attitude retaining arrangement. Inasmuch as the inclination of the moving shaft (the moving portion) 423A of the lens movable portion 42A is stabilized with respect to the outer sheath (the cabinet) 30B and as a consequence, the attitude of the lens driving portion 44B (the driving device 20B) is retained with respect to the outer sheath (the cabinet) 30B, it is possible to improve a shock and vibration resistance of the driving device 20B.

In the exemplary aspect of this invention, the attitude retaining arrangement may comprise a protrusion, provided in the vibration friction portion, for projecting in the expansion/contraction direction of the electro-mechanical transducer and a hole portion, bored in the outer sheath, in which the protrusion is inserted. Alternatively, the attitude retaining arrangement may comprise a hole, bored in the vibration friction portion, for extending in the expansion/contraction direction of the electro-mechanical transducer and a protrusion, provided in the outer sheath, which is inserted in the hole. Furthermore, the attitude retaining arrangement may comprise extending portions for extending from both ends of the rod-shaped moving portion in the expansion/contraction direction of the electro-mechanical transducer and receiving portions, provided in the outer sheath, for receiving the extending portions so as to be movable the moving portion in the expansion/contraction direction of the electro-mechanical transducer.

An exemplary advantage according to the invention is that it is possible to improve a shock and vibration resistance of the driving device because the driving device comprises the attitude retaining arrangement for retaining an attitude of the driving device with respect to the outer sheath.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims.

What is claimed is:

1. A driving device comprising:
    an electro-mechanical transducer having first and second end portions opposite to each other in an expansion/contraction direction;
    a static member coupled to the first end portion of said electro-mechanical transducer;
    a vibration friction portion coupled to the second end portion of said electro-mechanical transducer, said vibration friction portion having a V-shaped groove in cross section;
    a rod-shaped moving portion frictionally coupled to said vibration friction portion, said rod-shaped moving portion being movable in the expansion/contraction direction of said electro-mechanical transducer;
    an urging arrangement, fixed to said vibration friction portion, for urging said rod-shaped moving portion against said vibration friction portion at the V-shaped groove thereof;
    an outer sheath for covering said driving device; and
    an attitude retaining arrangement for retaining an attitude of said driving device with respect to said outer sheath.

2. The driving device as claimed in claim 1, wherein said attitude retaining arrangement comprises:
    a protrusion, provided in said vibration friction portion, which projects in the expansion/contraction direction of said electro-mechanical transducer; and
    a hole portion, bored in said outer sheath, in which said protrusion is inserted.

3. The driving device as claimed in claim 1, wherein said attitude retaining arrangement comprises:
    a hole, bored in said vibration friction portion, which extends in the expansion/contraction direction of said electro-mechanical transducer; and
    a protrusion, provided in said outer sheath, which is inserted in said hole.

4. The driving device as claimed in claim 1, wherein said attitude retaining arrangement comprises:
    extending portions which extend from both ends of said rod-shaped moving portion in the expansion/contraction direction of said electro-mechanical transducer; and
    receiving portions, provided in said outer sheath, which receive said extending portions so as to be movable with said moving portion in the expansion/contraction direction of said electro-mechanical transducer.

* * * * *